W. Z. WILKINSON.
FRAME FOR TRIMMER SAWS.
APPLICATION FILED JUNE 26, 1919.
1,323,138.
Patented Nov. 25, 1919.
2 SHEETS—SHEET 1.
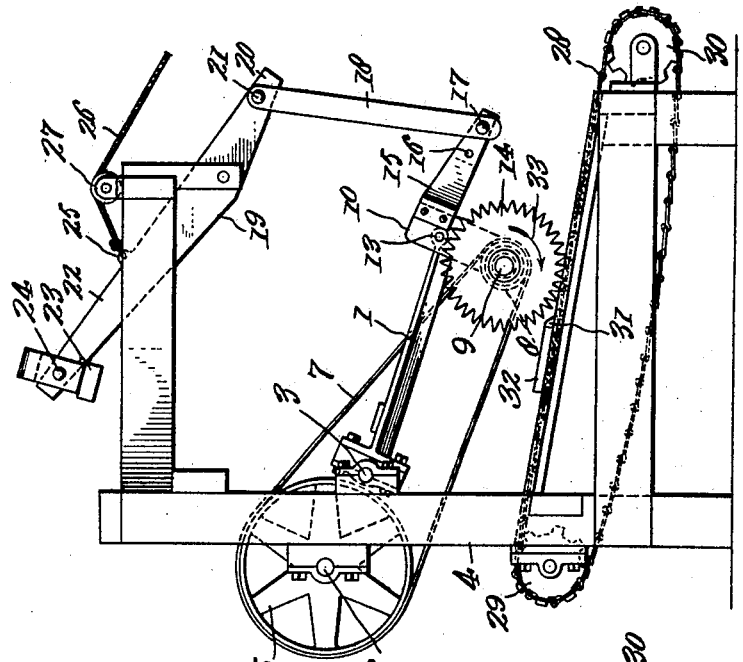
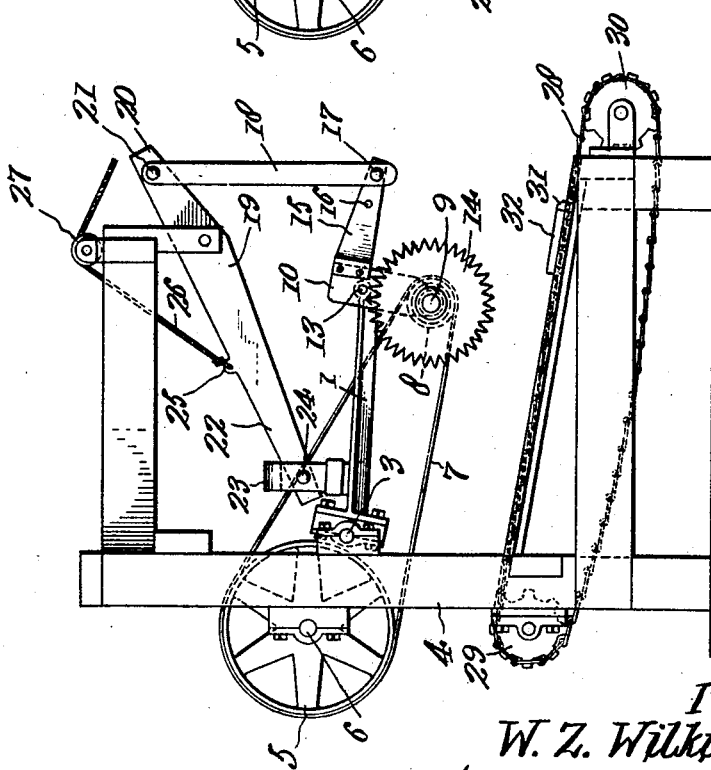
Inventor.
W. Z. Wilkinson.
by Wilkinson & Ginsta
Attorneys.

W. Z. WILKINSON.
FRAME FOR TRIMMER SAWS.
APPLICATION FILED JUNE 26, 1919.
1,323,138.
Patented Nov. 25, 1919.
2 SHEETS—SHEET 2.
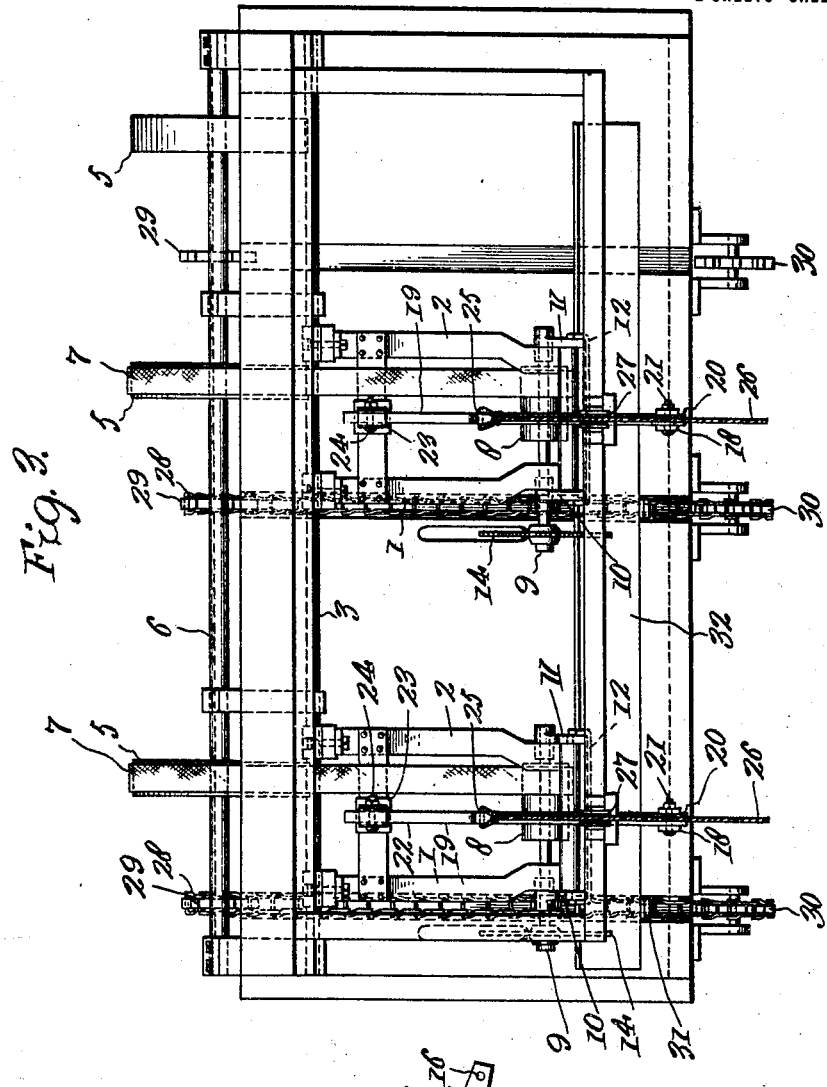
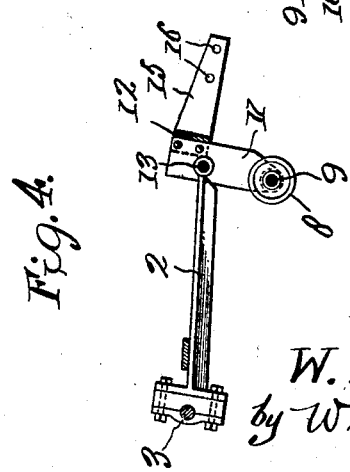
Inventor
W. Z. Wilkinson.
by Wilkinson & Giusta.
Attorneys.

UNITED STATES PATENT OFFICE.

WILLIAM Z. WILKINSON, OF BATON ROUGE, LOUISIANA.

FRAME FOR TRIMMER-SAWS.

1,323,138.     Specification of Letters Patent.     Patented Nov. 25, 1919.

Application filed June 26, 1919. Serial No. 306,915.

*To all whom it may concern:*

Be it known that I, WILLIAM Z. WILKINSON, a citizen of the United States, residing at Baton Rouge, in the parish of East Baton Rouge, State of Louisiana, have invented certain new and useful Improvements in Frames for Trimmer-Saws; and I do hereby declare the following to be a full, clear, and exact description of the invention, such as will enable others skilled in the art to which it appertains to make and use the same.

The present invention relates to improvements in frames for trimmer saws, and the primary object thereof is to provide an improved trimmer frame in which the saw will have a more effective operation with less loss of power by so arranging the various parts that a yielding tension is constantly imposed on the driving connections.

It is another object of the present invention to take advantage of the counterbalance employed at the present time for normally holding the saws out of contact with the work in an inoperative position, and which facilitates the movement of the saws and the trimmer frame into operative position where the saws may trim the lumber by utilizing such counterbalance to act through a movably mounted saw carrier in such a way as to impose a tension on the belt or other driving means which has connection to the saw carrier for driving the saw.

A still further object of the present invention resides in utilizing the reaction resulting from the rotation of the saw in contact with the work to also swing the saw carrier in a direction to impose a further tension on the drive belt.

In the accompanying drawings forming a part of this application, and in which similar reference symbols indicate corresponding parts in the several views:

Figure 1 is a side elevational view of an improved trimmer frame for saws as constructed in accordance with the present invention, and showing the trimmer frame and saw in the inoperative raised position.

Fig. 2 is a similar view showing the saw in the lowered operative position.

Fig. 3 is a top plan view of an apparatus showing two saws; and

Fig. 4 is a fragmentary view, partly in section, showing a detail.

Referring more particularly to the drawings, where I have illustrated one embodiment of the present invention, the trimmer frame is composed of a pair of parallel bars 1 and 2 pivoted as indicated at 3 on a rod secured to the framework or building 4. A pulley 5 is journaled to rotate on a shaft 6 also mounted in suitable bearings in the building or framework 4, and said pulley 5 is in connection with one end of a belt 7, the other end of which belt runs about a small pulley 8 fixed to a shaft 9 journaled in the lower part of a saw carrier, which, in this instance, is composed of a pair of substantially vertically extending bars 10 and 11 connected at their upper ends by a brace 12. The saw carrier, thus made up, is pivoted to swing about the outer free end of the trimmer frame, as indicated at 13.

A circular saw 14 is fixed on the shaft 9 near the bar 10, and this saw is adapted to be elevated and lowered out of and into contact with the work by the swinging movement of the trimmer frame. An arm 15 is connected to the saw carrier above the pivotal point 13 thereof, the connection of this arm 15 being preferably to the center of the brace 12.

The arm 15 carries a plurality of apertures 16 for receiving a pin 17, through which the lower end of a link 18 may be connected to the outer free end of said arm 15. A lever 19 has a short forward arm 20 connected to the upper end of the link 18, as indicated at 21, and the rear longer arm 22 of said lever is arranged to carry a counterweight 23, preferably pivoted thereon as designated at 24. An eye 25 on the longer rear arm 22 provides for receiving one end of a cord 26 which runs over a pulley 27, mounted at a suitable point on the framework, and from this pulley the cord or cable 26 is to be arranged within the convenient grasp of the operator.

The saw mill framework is of any suitable character, as is also the mechanism for feeding the lumber to the saw 14, and in the instance illustrated this feeding mechanism is composed of a chain 28 which runs over a pair of sprockets 29 and 30, and the chain carries one or more cleats 31, which engage behind the lumber, as shown at 32, and carry such lumber into engagement with the saw 14; the chain 28, as clearly shown in Fig. 3, being of course located out of the path of the saw 14.

Now, of course, as many of these trimmer frames and saws may be used as desired, the same being, in accordance with the usual practice, mounted side by side as indicated in Fig. 3, and being so adjusted and arranged that such saws are at the proper distance apart in order to cut the lumber in the requisite lengths.

The operation of the invention is as follows:

In use, the saw 14 is normally in the elevated position out of contact with the lumber 32, as is clearly illustrated in Fig. 1. This elevated position of the saw 14 is the normal position of the same, and the counterweight 23 is responsible for this raised position. When, however, the saw is to be brought down into engagement with the lumber or other work 32, the cord or cable 26 is pulled upon by the operator, thus lifting the counterweight 23 and causing the descent of the various parts connected to the lever 19, as shown in Fig. 2. In this Fig. 2, the lumber 32 is also shown as having been advanced through and severed by the saw 14.

Now the weight 23, in addition to its usual counterbalancing function, is also active to impose a yielding constant tension on the belt 7, so as to avoid any slip of the belt on the pulleys 5 and 8 and to avoid thereby loss of power transmitted from the drive pulley 5 to the saw 14. This action of the counterweight 23 takes place by reason of the pivoting of the saw carrier on the trimmer frame as at 13, and the effective connection of the counterweight 23 above the pivotal point 13.

The counterweight 23 of course acts through the link 18 and arm 15, which latter is joined to the brace 12, and consequently such counterweight will constantly tend to rotate the saw carrier in a counter-clockwise direction about the pivotal point 13, which causes the pulley 8 on the saw carrier to be moved away from the drive pulley 5 and consequently to impose a tension on the belt 7. In addition to the tension thus imposed upon the belt 7, an additional tension thereon is also secured through having the saw carrier pivoted on the trimmer frame, and this latter action is the result of the reaction between the saw 14 and the lumber 32.

The saw 14 turns in a clockwise direction, as indicated by the arrow 33 in Fig. 2, and the reaction through the saw 14 and the saw carrier by reason of the resistance encountered by the saw teeth in cutting through the lumber 32, tends to also swing the saw carrier about the pivotal point 13 in a counter-clockwise direction, and this turning moment in the saw carrier has the further effect to draw the belt 7 taut and prevent slippage and loss of power.

It is obvious that those skilled in the art may vary the details of construction and arrangement of parts without departing from the spirit of my invention, and therefore I do not wish to be limited to such features except as may be required by the claims.

I claim:

1. In a device as specified, the combination of a movable trimmer frame, a saw carrier movable on said trimmer frame, a drive connection for actuating the saw, and a counterbalance for said trimmer frame acting through said saw carrier to impose a tension on said drive connection, substantially as described.

2. In a device as specified, the combination of a pivoted trimmer frame, a saw carrier movably mounted on said pivoted trimmer frame, a saw supported on said carrier, a drive means having connection to said saw carrier for actuating said saw, and a counterbalance for said pivoted trimmer frame acting through said movable saw carrier to constantly impose a tension on said drive means, substantially as described.

3. In a device as specified, the combination of a movably mounted trimmer frame, a saw carrier pivoted on said movable trimmer frame, a saw supported on said carrier, drive means having connection to said saw carrier for actuating the saw, and a counterbalance for said movably mounted trimmer frame acting through said saw carrier to impose a tension on said drive means, substantially as described.

4. In a device as specified, the combination of a pivoted trimmer frame, a saw carrier pivotally mounted on said pivoted trimmer frame, a saw supported on said carrier, drive means having connection to said pivoted saw carrier for actuating the saw, and a counterbalance for said pivoted trimmer frame acting through said pivoted saw carrier for imposing a tension on said drive means, substantially as described.

5. In a device as specified, the combination of a movably mounted trimmer frame, a saw carrier movable with respect to said trimmer frame, a driver, a follower on said saw carrier, a connection between said driver and follower, a saw on said saw carrier, and counterbalance means for said movably mounted trimmer frame acting through said movable saw carrier whereby to impose a tension on said connection, substantially as described.

6. In a device as specified, the combination of a movably mounted trimmer frame, a saw carrier independently movable with respect to said trimmer frame, a saw on said saw carrier, a driver, a follower on said saw carrier arranged to operate said saw, a belt connected between said driver and follower, and counterbalance means for said movably mounted trimmer frame acting through said independently movable saw carrier for imposing a tension on said belt, substantially as described.

7. In a device as specified, the combination of a pivoted trimmer frame, a saw carrier independently pivoted on said trimmer frame, a rotary saw on said carrier, a follower pulley turning with said saw, a drive pulley, a belt between said drive and follower pulleys, and counterbalance means for said trimmer frame acting through said saw carrier to impose a tension on said belt through the follower pulley, substantially as described.

8. In a device as specified, the combination of a framework, a trimmer frame pivoted on said framework, a saw carrier independently pivoted on said trimmer frame, a shaft journaled on said saw carrier, a saw on said shaft, a follower pulley also on said shaft, a drive pulley journaled on said framework, a belt between said pulleys for transmitting power to said saw, and counterbalance means for said pivoted trimmer frame acting through said pivoted saw carrier for imposing a tension on said belt through said follower pulley, substantially as described.

9. In a device as specified, the combination of a movably mounted trimmer frame, a saw carrier pivoted on said trimmer frame, a saw on said carrier, drive means in connection with said saw carrier for actuating the saw, an arm on said saw carrier, a link connected to said arm, a lever having connection to said link, a counterbalance on said lever, and means for operating said movably mounted trimmer frame together with the counterbalance, substantially as described.

WILLIAM Z. WILKINSON.